US011845909B2

(12) United States Patent
De Angelis et al.

(10) Patent No.: US 11,845,909 B2
(45) Date of Patent: Dec. 19, 2023

(54) METHOD FOR THE EXTRACTION OF BIO-OIL FROM ALGAL BIOMASS

(71) Applicant: ENI S.P.A., Rome (IT)

(72) Inventors: Alberto Renato De Angelis, San Donato Milanese (IT); Filomena Castaldo, San Donato Milanese (IT)

(73) Assignee: ENI S.P.A., Rome (IT)

( * ) Notice: Subject to any disclaimer, the term of this patent is extended or adjusted under 35 U.S.C. 154(b) by 0 days.

(21) Appl. No.: 17/274,628

(22) PCT Filed: Sep. 9, 2019

(86) PCT No.: PCT/EP2019/073925
§ 371 (c)(1),
(2) Date: Mar. 9, 2021

(87) PCT Pub. No.: WO2020/053118
PCT Pub. Date: Mar. 19, 2020

(65) Prior Publication Data
US 2022/0089969 A1 Mar. 24, 2022

(30) Foreign Application Priority Data

Sep. 10, 2018 (IT) .................. 102018000008453
Sep. 13, 2018 (IT) .................. 102018000008566

(51) Int. Cl.
| | |
|---|---|
| *C11B 1/10* | (2006.01) |
| *C10G 3/00* | (2006.01) |
| *C10L 1/02* | (2006.01) |
| *C10L 1/04* | (2006.01) |
| *C11B 1/04* | (2006.01) |
| *C11B 3/00* | (2006.01) |
| *C11B 3/12* | (2006.01) |

(52) U.S. Cl.
CPC .............. *C11B 1/10* (2013.01); *C10G 3/42* (2013.01); *C10G 3/50* (2013.01); *C10L 1/02* (2013.01); *C10L 1/04* (2013.01); *C11B 1/04* (2013.01); *C11B 1/108* (2013.01); *C11B 3/001* (2013.01); *C11B 3/006* (2013.01); *C11B 3/008* (2013.01); *C11B 3/12* (2013.01); *C10G 2300/1014* (2013.01); *C10L 2200/0484* (2013.01)

(58) Field of Classification Search
CPC ... C11B 1/04; C11B 1/10; C11B 3/001; C11B 3/006; C11B 3/008; C10G 3/42; C10G 3/50
See application file for complete search history.

(56) References Cited

U.S. PATENT DOCUMENTS

| | | | | |
|---|---|---|---|---|
| 2007/0135666 A1* | 6/2007 | Koivusalmi | ............. | C10G 3/46 585/21 |
| 2012/0116105 A1* | 5/2012 | Aaltonen | .................. | C11B 1/10 554/20 |

FOREIGN PATENT DOCUMENTS

| | | |
|---|---|---|
| CN | 107129860 A | 9/2017 |
| WO | 2015/181279 A1 | 12/2015 |
| WO | 201700603 A1 | 1/2017 |

OTHER PUBLICATIONS

Naser, J. et al., Molar heat capacity of selected Type III Deep Eutectic Solvents, Journal of Chemical & Engineering Data, No. 16, pp. 1608-1615 (Year: 216).*
Lu, W. et al., A new approach of microalgal biomass pretreatment using deep eutectic solvents for enhanced lipid recovery for biodiesel production, Bioresource Technology, vol. 218, pp. 123-128 (Year: 2016).*
Pan, Y. et al., One-step production of biodiesel from wet and unbroken microalgae biomass using deep eutectic solvent, Bioresource Technology, vol. 21, 23, pp. 157-163 (Year: 2017).*
Du, C., et al., Effect of water presence on choline chloride-2urea ionic liquid and coating plating from the hydrated ionic liquid, Nature, Scientific Reports, 6, 29225, pp. 1-14 (Year: 2016).*
Florindo, C., et al., Insights into the synthesis and properties of deep eutectic solvents based on cholinium chloride and carboxylic acids, American Chemical Society, Sustainable Chemistry & Engineering, 2, pp. 2416-2425 (Year: 2014).*
Smith, E.L., et al., Deep eutectic solvents (DES) and their applications, Chemical Reviews, 114, pp. 11060-11082 (Year: 2014).*
Lu Weidong et al; "A New Approach of Microalgal Biomass Pretreatment using Deep Eutectic Solvents for Enhanced Lipid Recovery for Biodiesel Production"; Bioresource Technology; Elsevier, Amsterdam, NL; vol. 218, 2016; pp. 123-128.
Pan Ying et al; "One-Step Production of Biodiesel from Wet and Unbroken Microalgae Biomass using Deep Eutectic Solvent"; Bioresource Technology; Elsevier, Amsterdam, NL; vol. 238; Apr. 11, 2017; p. 158.
S.P. Jeevan Kumar et al; "Sustainable Green Solvents and Techniques for Lipid Extraction from Microalgae: A Review"; Algal Research; vol. 21, 23; Nov. 2016; pp. 138-147.
International Search Report dated Nov. 14, 2019 for PCT application No. PCT/EP2019/073925.
Written Opinion dated Nov. 14, 2019 for PCT application No. PCT/EP2019/073925.
Chinese First Office Action dated Apr. 22, 2022 from corresponding Chinese Application No. 201980059677.3, 51 pages.

* cited by examiner

*Primary Examiner* — Yate' K Cutliff
(74) *Attorney, Agent, or Firm* — Ruggiero McAllister & McMahon LLC

(57) ABSTRACT

There is a method for extracting bio-oil from algal biomass, in particular oily microalgae, using solvents of a Deep Eutectic Solvents (DES) capable of producing a bio-oil with a low content of phospholipids and inorganic salts, mainly sodium chloride.

12 Claims, No Drawings

METHOD FOR THE EXTRACTION OF BIO-OIL FROM ALGAL BIOMASS

CROSS-REFERENCE TO RELATED APPLICATIONS

The present application claims priority based on PCT Application No. PCT/EP2019/073925, filed Sep. 9, 2019, which claims priority based on Italy Patent Application No. 102018000008566, filed Sep. 13, 2018, and Italy Patent Application No. 102018000008453, filed Sep. 10, 2018, all of which are incorporated herein by reference in their entireties.

FIELD OF THE DISCLOSURE

The present invention relates to a method for extracting bio-oil from algal biomass, in particular oily microalgae, using solvents comprising a low melting point eutectic (Deep Eutectic Solvents (type III DESs)), capable of producing a bio-oil with a low content of phospholipids and inorganic salts, mainly sodium chloride.

DESCRIPTION OF THE RELATED ART

Bio-oil is extracted using both chemical and physical processes from both wet and dry algal biomass, although the technical problems can differ greatly because of the fact that the water present can indirectly affect the extraction capacity of the systems used.

The Folch method/procedure (Folch J., Lees, M., Stanley G. H. S.; "A simple method for the isolation and purification of total lipids from animal tissues."; J. Biol. Chem., (1957) 226; pp. 497-509) comprises a 2:1 chloroform/methanol mixture and is a method commonly used as an analytical reference.

The extraction of algae biomass requires further treatment to yield a fraction described as bio-diesel, since it contains a triacylglycerols component which has to be chemically treated because it causes high viscosity in the oil and the formation of surface foams. Transesterification of fatty acids is usually essential to obtain biofuels, as it converts glycerol-bound fatty acids into lower molecular weight methyl/ethyl esters (FAME, Fatty Acid Methyl ester).

Alternatively the bio-oil obtained may undergo processes called Ecofining which involve a hydrogenation and hydroisomerisation reaction with final conversion into an alkane mixture that can be used as a diesel fuel, as described, for example, in international patent application WO2015/181744 or international patent application WO2015/181279.

For the Ecofining process it is particularly important that the oil undergoing hydrogenation treatment has a low content of both phospholipids and inorganic salts, as these compounds can cause a rapid deactivation of the hydrogenation catalyst.

No commercial methods for extracting bio-oil from algae that minimise phospholipids or inorganic salts are known, as most methods for extracting bio-oil from algae aim to produce lower molecular weight methyl/ethyl esters (FAME, Fatty Acid Methyl ester) and are not concerned with reducing possible catalyst pollutants.

SUMMARY OF THE DISCLOSURE

This bio-oil can then be conveniently used in industrial processes involving a hydrogenation step with metal catalyst.

Through the cultivation of oily microalgae $CO_2$ can be converted into organic derivatives such as sugars or fats by chlorophyll photosynthesis, thus reducing the worldwide content of this greenhouse gas.

These microorganisms are plants that accumulate energy from the sun as reserves in the form of vegetable oil through chlorophyll photosynthesis, with greater energy efficiency than all the other oily plants in nature (the most common ones such as seeds, peanuts, olives, sunflowers, corn, but also rapeseed, palm and jatropha); they accumulate up to 50% of their mass as oil. It is these micro-organisms that, together with animal organisms, have created petroleum reserves over the millennia. These microalgae can be grown where food plants cannot be grown: in water (sea water, freshwater) and less well on arid and rocky soils and even in the desert. Dry soils can also be used as a passive support for tanks for the culture of microalgae in water. Thus cultivating them is not detrimental to normal agriculture, as is the case with ethanol from wheat, rice, potatoes, etc.

The algae produced can contain significant amounts of bio-oil, one of the most promising sources for the production of bio-diesel.

The object of the present invention is a method for extracting bio-oil from algal biomass that includes the following stages:
i) preparation of a suitable solvent consisting of a deep eutectic solvent DES;
ii) preparation of the algal biomass;
iii) treatment of the algal biomass with the solvent consisting of deep eutectic solvent (DES) at a temperature between 20° C. and 120° C.;
iv) separation of the solid residue by filtration or centrifugation;
v) treatment of the filtrate or centrifugate obtained in stage iv) with an appropriate solvent, and separation of the oil phase;
vi) drying to yield the bio-oil.

DETAILED DESCRIPTION OF THE DISCLOSURE

Eutectic solvents consisting of deep eutectic solvents (DESs) are fluids generally composed of two or three safe and inexpensive components that are capable of self-association, often via hydrogen bonds, to form a eutectic mixture with a significantly lower melting point than that of the individual components. A typical low melting point eutectic mixture (type III Deep Eutectic Solvents (DESs)) is made up of a quaternary ammonium salt and a hydrogen bonding donor. They are versatile, economical, compatible with the environment and biodegradable. Type III Deep Eutectic Solvents (DESs) which include an ammonium salt such as choline chloride, choline acetate, choline nitrate, betaine chloride, ethyl ammonium chloride, tetramethylammonium chloride, and a hydrogen bonding donor chosen from a carboxylic acid such as acetic acid, formic acid, tartaric acid, oxalic acid, levulinic acid, or an amine such as urea, thiourea, 1,3-dimethylurea, 1,1-dimethylurea, or a polyalcohol such as ethylene glycol, propylene glycol or glycerol are conveniently used.

In type III Deep Eutectic Solvents the quaternary ammonium salt and the hydrogen bond donor are mixed together in a molar ratio of between 1:1 and 1:3; the mixture thus obtained being heated to a temperature of 80-100° C. for a period of 30 minutes to yield a clear colourless liquid, which remains so once the DES is brought back to a temperature close to ambient.

The algae preferably used in the extraction process belong to the genera *Nannochloropsis, Chlorella* or *Tetraselmis*. The method claimed in this patent can be applied either directly to wet algal biomass, obtained for example by separation from an algal suspension in water or aqueous solution (e.g. seawater), for example by microfiltration or centrifuging, or dry algal biomass obtained from the same with an additional drying stage. The wet algal biomass that can be treated with DES according to the process of the present invention preferably contains up to 90%, more preferably from more than 5% to 70%, by weight of water compared to the total weight of wet biomass.

A preferred aspect of the drying stage is to use low pressure steam, typically available as waste heat in industrial plants, as an energy source.

Dry algal biomass can contain up to 5%, preferably up to 3%, residual moisture.

To extract the bio-oil from the algae, the algal mass is treated with a quantity of DES of between 1:1 and 5:1 in relation to the algal mass, agitating the dispersion for a period of between ½ hour and two hours at temperatures between 80 and 130° C.

After this period the dispersion so obtained is filtered, the insoluble solid is separated off and the liquid phase in which the DES is dissolved is treated in stage (v) with a quantity of an appropriate solvent constituted by a liquid acting as a counter-solvent, i.e. one that makes the organic phase comprising the bio-oil in the mixture thus formed insoluble. The counter-solvent liquid is conveniently miscible with the DES and essentially immiscible or very little miscible with the bio-oil. This liquid is added to the bio-oil solution in DES in a weight ratio of between 100 and 300% by weight, agitated at ambient temperature and the supernatant organic phase consisting of bio-oil is separated out. The preferred counter-solvent is water, or strongly polar alcohols such as ethanol, methanol, or mixtures thereof.

The phase obtained after adding the counter-solvent, in which the counter-solvent is dissolved, separates out and removed by distillation, while the DES is recycled. If dry algal biomass has to be treated, treatment to dry the DES is preferable, whereas if wet algal biomass is to be treated the DES can be recycled as such.

If the counter-solvent is water, when water is added it precipitates out a solid phase consisting of micron-sized cellulose, which can be separated out and used commercially, in addition to separating a supernatant phase consisting of bio-oil.

This cellulose can advantageously be used as a precursor for industrial derivatives of cellulose, such as nitrocellulose or cellulose acetate, or as such to obtain finished products based on cellulose, such as filters or paper materials.

In one embodiment of the present invention the separation between bio-oil dissolved in DES and the residual algal mass is effected using a screw filter.

The process is simplified as a result in that both extraction and separation are carried out in the same operating unit.

Using the process according to this invention it is therefore possible to effectively extract a bio-oil with a low content of both phospholipids and inorganic salts in comparison with what can be obtained by using known methods. The present process thus ensures long catalyst life and a lower cost for the industrial process.

In addition, some of these known methods are aimed at obtaining a bio-oil particularly rich in some components for the production of products other than a Diesel fuel and oriented for example towards the nutraceutical sector, therefore using high cost solvents or very expensive processes from the energy point of view which cannot economically be used for the production of a bio diesel, such as extraction with supercritical $CO_2$.

The present invention also relates to the use of bio-oil obtained as described above in the production of fuel.

Preferred use of the bio-oil obtained according to the process described above is as a feedstock for an Ecofining process in which the bio-oil first undergoes a catalytic hydrogenation reaction in which the fatty acids are converted into alkanes and water, while the glycerine present in the triglycerides is hydrogenated to propane; in the second step of the process the alkanes obtained by hydrogenation of the fatty acids are isomerised on a solid acid catalyst yielding branched alkanes, with a lower melting point than linear alkanes and better performance as bio components for diesel.

EXAMPLES

Example 1

Preparation of Type III DES (Choline Chloride-Ethylene Glycol Molar Ratio 1:2)

One mole of choline chloride equal to 139.62 g was placed in a glass beaker and to this was added 124.14 g of ethylene glycol (equal to two moles), the dispersion was agitated and heated to 80° C. A colourless transparent liquid, which remained transparent when cooled to ambient temperature, was formed. The melting point of this eutectic between choline chloride and ethylene glycol is −66° C., clearly lower than both ethylene glycol (−13° C.) and choline chloride (302° C.).

Example 2

Extraction of Bio-Oil from Algal Mass with Type III DES (Choline Chloride-Ethylene Glycol)

5 g of dry algal mass comprising 3.777 g of sodium chloride and 1.227 g of *Nannochloropsis saline* algae was placed in a glass reactor, 10 g of DES choline chloride-ethylene glycol (prepared as described in Example 1 and in a molar ratio of 1:2) was added, it was closed and heated to 80° C. with agitation for 30 minutes.

A residue formed and was filtered out. The remaining liquid phase consisting of the extracted bio-oil was placed in a second reactor to which 5 g of distilled water was added.

A supernatant oily phase and an underlying DES-water phase then formed and separated. The oil phase 0.061 g) was analysed by both 13C NMR and elemental analysis and the following results were obtained:

| DES | NaCl % in extract | $^{13}$C NMR (% moles) | | | |
|---|---|---|---|---|---|
| | | Free fatty acids | tri-glycerides | phospholipids | ketones |
| Choline chloride - ethylene glycol | 0.28 | 8 | 92 | <0.1 | 0 |

The oil phase thus obtained can be sent for catalytic hydrogenation treatment according to the process as described in international applications WO2015/181744 and WO2015/181279, as such, or even more preferably after drying, to obtain a bio diesel.

Example 3

Preparation of Type III DES (Choline Chloride-Formic Acid Molar Ratio 1:1)

Three moles of choline chloride equal to 418.86 g were placed in a glass beaker and to this was added 138.09 g of formic acid (equal to three moles), the dispersion was shaken and heated to 80° C. A colourless transparent liquid, which remained transparent when cooled to ambient temperature, was formed. The melting point of this eutectic liquid between choline chloride and formic acid is −32° C., clearly lower than both formic acid (8.4° C.) and choline chloride (302° C.).

Example 4

Extraction of Bio-Oil from Algal Mass with Type III DES (Choline Chloride-Formic Acid)

100.09 g of dry algal mass consisting of 48.51 g of sodium chloride and 51.49 g of *Nannochloropsis saline* algae were placed in a glass reactor, 486 g of DES choline chloride-formic acid (prepared as described in Example 3 and in a molar ratio of 1:1) was added, it was closed and heated to 100° C. with agitation for 30 minutes.

A residue formed and was filtered out. The remaining liquid phase consisting of the extracted bio-oil was placed in a second reactor to which 500 g of distilled water was added.

A supernatant oily phase and an underlying DES-water phase were then formed and separated out. The oil phase (0.74 g) was analysed by both $^{13}$C NMR and elemental analysis and the following results were obtained:

| DES | NaCl % in extract | $^{13}$C NMR (% moles) | | | |
|---|---|---|---|---|---|
| | | Free fatty acids | tri-glycerides | phospholipids | ketones |
| Choline chloride - formic acid | 0.038 | 0 | 99 | <0.1 | 0 |

The oil phase thus obtained can be sent for catalytic hydrogenation treatment according to the process as described in international applications WO2015/181744 and WO2015/181279, as such, or even more preferably after drying, to obtain a bio diesel.

Example 5

Preparation of Type III DES (Choline Chloride-Oxalic Acid)

One mole of choline chloride equal to 139.62 g was placed in a glass beaker and to this was added 90.03 g of oxalic acid (equal to one mole), the dispersion was shaken and heated to 80° C. A colourless transparent liquid, which remained transparent when cooled to ambient temperature, was formed. The melting point of this eutectic liquid between choline chloride and oxalic acid is 34° C., clearly lower than that of both oxalic acid (190° C.) and choline chloride (302° C.).

Example 6

Extraction of Bio-Oil from Algal Mass with Type III DES (Choline Chloride-Oxalic Acid)

4.504 g of dry algal mass consisting of 3.4 g of sodium chloride and 1.104 g of *Nannochloropsis saline* algae were placed in a glass reactor, 20 g of DES choline chloride-oxalic acid (prepared as described in Example 5 and in a molar ratio of 1:1) was added, it was closed and heated to 100° C. with agitation for 30 minutes.

A residue formed and was filtered out. The remaining liquid phase consisting of the extracted bio-oil was placed in a second reactor to which 10 g of distilled water was added.

A supernatant oily phase and an underlying DES-water phase then formed and separated out. The oil phase (0.095 g) was analysed by both 13C NMR and elemental analysis and the following results were obtained:

| DES | NaCl % in extract | $^{13}$C NMR (% moles) | | | |
|---|---|---|---|---|---|
| | | Free fatty acids | tri-glycerides | phospholipids | ketones |
| Choline chloride - oxalic acid | 0.039 | 5.4 | 94.6 | <0.1 | 0 |

The oil phase thus obtained can be sent for catalytic hydrogenation treatment according to the process as described in international applications WO2015/181744 and WO2015/181279, as such, or even more preferably after drying, to obtain a bio diesel.

Example 7

Preparation of Type III DES (Choline Chloride-Levulinic Acid)

One mole of choline chloride equal to 139.62 g was placed in a glass beaker, and to this was added 116.11 g of levulinic acid (equal to one mole), the dispersion was shaken and heated to 80° C. A colourless transparent liquid, which remained transparent when cooled to ambient temperature, was formed. The melting point of this eutectic liquid between choline chloride and levulinic acid is −27° C., clearly lower than both formic acid (35° C.) and choline chloride (302° C.).

Example 8

Extraction of Bio-Oil from Algal Mass with Type III DES (Choline Chloride-Levulinic Acid)

2.502 g of dry algal mass consisting of 1.889 g of sodium chloride and 0.614 g of *Nannochloropsis saline* algae were placed in a glass reactor, 10 g of DES choline chloride-levulinic acid (prepared as described in Example 7 and in a molar ratio of 1:1) was added, it was closed and heated to 80° C. with agitation for 30 minutes.

A residue formed and was filtered out. The remaining liquid phase consisting of the extracted bio-oil was placed in a second reactor to which 10 g of distilled water was added.

A supernatant oily phase and an underlying DES-water phase were then formed and separated out. The oil phase (0.035 g) was analysed by both $^{13}$C NMR and elemental analysis and the following results were obtained:

| DES | NaCl % in extract | Free fatty acids | tri-glycerides | phospholipids | ketones |
|---|---|---|---|---|---|
| Choline chloride - formic acid | 0.093 | 5.6 | 92.8 | <0.1 | 1.6 |

The oil phase thus obtained can be sent for catalytic hydrogenation treatment according to the process as described in international applications WO2015/181744 and WO2015/181279, as such, or even more preferably after drying, to obtain a bio diesel.

Example 9

Catalytic Hydrogenation of Algal Oil Prepared According to Example 3

The bio-oil obtained as described in Example 3 can be converted, as previously described in international applications WO2015/181744 and WO2015/181279, into a mixture of paraffins with various degrees of branching through two successive catalytic reactions:
1. In the first the triglyceride mixture obtained in Example 3 undergoes a catalytic hydrodeoxygenation reaction, feeding the mixture to a fixed bed reactor filled with a catalyst consisting of mixed cobalt and molybdenum sulfides on alumina (3% cobalt content by weight, molybdenum content equal to 30% weight), the reaction taking place at a pressure of 10 MPa, at 300° C., at an LHSV of 1 $h^{-1}$, with a Hz/triglyceride mixture molar ratio of 20: At the reactor outlet two phases were obtained, and these were separated: a gaseous phase consisting of unreacted Hz, $CO_2$, $H_2S$, water, propane and traces of other light alkanes; and a liquid phase consisting of linear alkanes equivalent in chain length to the triglycerides from which they came.
2. In the second, the liquid mixture of linear hydrocarbons was then subjected to a hydroisomerisation reaction, feeding it to a reactor with a fixed bed filled with an acid catalyst consisting of silica alumina or zeolite at 350° C., at a pressure of 5 MPa, at an LHSV of 2 $h^{-1}$, with a volumetric Hz/mixed linear alkanes ratio equal to 200/1.

This resulted in a mixture of branched alkanes, which have better cold properties than the mixture of linear alkanes.

Example 10 (Comparative) Extraction of Bio-Oil from Algal Mass with Ionic Liquid Methylactylimidazolium Chloride 5.062 g of dry algal mass consisting of 3.725 g sodium chloride and 1.337 g of *Nannochloropsis saline* algae were placed in a glass reactor and 10.13 g methylactylimidazolium chloride were added. The reactor was closed and heated to 80° C. with agitation for 30 minutes.

A residue formed and was filtered out. The remaining solution of bio-oil in a ionic liquid was transferred in a second reactor and 5 g of water were added under stirring. A supernatant oily phase and an underlying ionic liquid-water phase were then formed and separated out. The oily phase (0.095 g) was analysed by both $^{13}C$ NMR and elemental analysis and the following results were obtained:

| Ionic Liquid | NaCl % in extract | Free fatty acids | tri-glycerides | phos-pholipids | ketones |
|---|---|---|---|---|---|
| Methyl-octylimidazolium chloride | 2.63 | 12 | 87 | 1.0 | 0 |

As it can be observed, a great amount of sodium chloride was extracted together with the oil when an ionic liquid was used to treat the algae.

The invention claimed is:
1. Method for the extraction of bio-oil from an algal biomass comprising the following stages:
   i) preparation of a deep eutectic solvent (DES) consisting of admixing of one or more quaternary salt compounds and one or more hydrogen bonding donor compounds;
   ii) provision of the algal biomass;
   iii) treatment of the algal biomass with a solvent consisting of the deep eutectic solvent of stage i); wherein the deep eutectic solvent is an extraction solvent, wherein the algal mass is treated with a quantity of the deep eutectic solvent of stage i) between 1:1 and 5:1 in relation to the algal mass and agitated for a period of between ½ hour and two hours at temperatures between 80° C. and 130° C. to form a liquid phase that includes a solid residue therein;
   iv) separation of the solid residue from the liquid phase by filtration or centrifugation forming a remaining liquid phase including an extracted bio oil;
   v) treatment of the remaining liquid phase obtained in stage (iv) with a countersolvent and separation of an oil phase including the bio-oil and having a low content of phospholipids and inorganic salts; and
   vi) drying to yield the bio-oil.
2. Method according to claim 1, wherein the deep eutectic solvent is selected from type III deep eutectic solvents.
3. Method according to claim 1, wherein the one or more quaternary salt compounds of the deep eutectic solvent is selected from the group consisting of choline chloride, choline acetate, choline nitrate, betaine chloride, ethyl ammonium chloride, and tetramethylammonium chloride; and wherein the one or more hydrogen bonding donors of the deep eutectic solvent is selected from a carboxylic acid selected from the group consisting of acetic acid, formic acid, tartaric acid, oxalic acid, and levulinic acid; an amine selected from the group consisting of urea, thiourea, 1,3-dimethylurea, and 1,1-dimethylurea; or a polyalcohol selected from the group consisting of ethylene glycol, propylene glycol and glycerol.
4. Method according to claim 1, in which the algae used belong to the genera *Nannochloropsis, Chlorella*, or *Tetraselmis*.
5. Method according to claim 1, wherein the algal biomass is a wet algal biomass.
6. Method according to claim 1, wherein drying is carried out using low pressure steam as an energy source.
7. Method according to claim 1, wherein the treated algal mass obtained in stage (iii) is filtered, wherein the solid residue is separated out and the remaining liquid phase in which the deep extraction solvent is dissolved is treated in stage (v) with a quantity of the counter-solvent to produce a first organic phase including a bio-oil insoluble, wherein the first organic phase is a liquid and is added to a quantity of the deep extraction solvent in a weight ratio of between 100% and 300% by weight to form a bio-oil solution, and wherein the bio-oil solution is agitated at ambient temperature and a second, supernatant organic phase with the bio-oil is separated out.

8. Method according to claim 7, wherein the counter-solvent is selected from the group consisting of water, methanol, ethanol, and mixtures thereof.

9. Method according to claim 1, wherein the oil phase obtained after addition of the counter-solvent in stage v) in which the counter-solvent is dissolved is separated out and the counter-solvent is removed by distillation, while the deep extraction solvent is recycled.

10. Method for the production of diesel fuel, comprising extracting a bio-oil from an algal biomass according to claim 1, and further including a step of subjecting the bio-oil to a hydrogenation step with a metal catalyst and to isomerization.

11. Method of production according to claim 10, wherein the bio-oil undergoes a catalytic hydrogenation reaction in a first step, in which triglycerides of fatty acids are converted into alkanes and water while glycerines present in the triglycerides are hydrogenated to propane; and further comprising a second step of the process in which the alkanes obtained by hydrogenation of the fatty acids are isomerised on a solid acid catalyst yielding branched alkanes as bio components for diesel fuel.

12. Method according to claim 1, wherein the algal biomass is dry algal biomass.

* * * * *